United States Patent [19]

Lowe

[11] Patent Number: 4,902,112

[45] Date of Patent: Feb. 20, 1990

[54] VARIABLE DENSITY LIGHT TRANSMITTING DEVICE

[76] Inventor: Gregory E. Lowe, 4172 Piedra Ct., Boulder, Colo. 80301

[21] Appl. No.: 853,200

[22] Filed: Apr. 17, 1986

[51] Int. Cl.$^4$ .............................................. G02B 5/30
[52] U.S. Cl. .................................... 350/396; 350/407; 351/49
[58] Field of Search .................. 350/396, 407; 351/49

[56] References Cited

U.S. PATENT DOCUMENTS

| | | | |
|---|---|---|---|
| 2,617,329 | 11/1952 | Dreyer | 350/396 |
| 2,720,553 | 10/1955 | Toulon | 350/408 |
| 3,054,204 | 9/1962 | Yates | 350/407 |
| 3,437,401 | 4/1969 | Siksai | 350/407 |
| 3,944,346 | 3/1976 | Shindler | 350/407 |
| 4,286,843 | 9/1981 | Reyblatt | 350/396 |

Primary Examiner—Rodney B. Bovernick
Assistant Examiner—Martin Lerner
Attorney, Agent, or Firm—William P. O'Meara

[57] ABSTRACT

A variable density light transmitting device comprising a first light transmitting layer having a plurality of light polarizing areas with differently oriented transmission axes; a second light transmitting layer overlying said first light transmitting layer and movable relative said first layer while remaining generally parallel to said first layer, said second light transmitting layer having a plurality of light polarizing areas of differently oriented transmission axes of corresponding site and arrangement to said light polarizing areas on said first light transmitting layer; said light polarizing areas on said first layer being selectively positionable opposite different ones of said light polarizing areas of said second layer by relative movement of said first layer with respect to said second layer; whereby variable density light transmission is provided through said first and second layers by said relative movement. In one embodiment the relative movement is linear, and in another embodiment the relative movement is rotational.

11 Claims, 5 Drawing Sheets

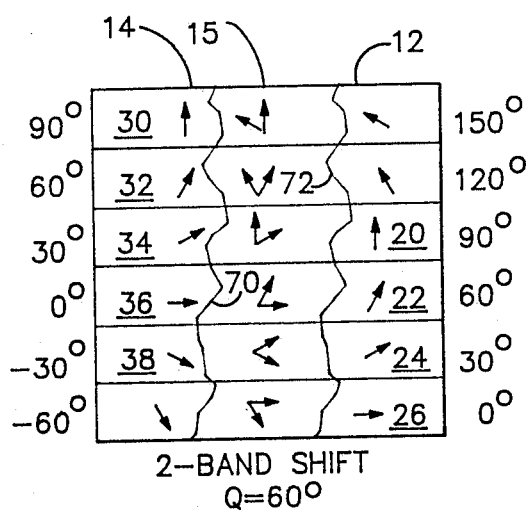
FIG.6 2-BAND SHIFT Q=60°
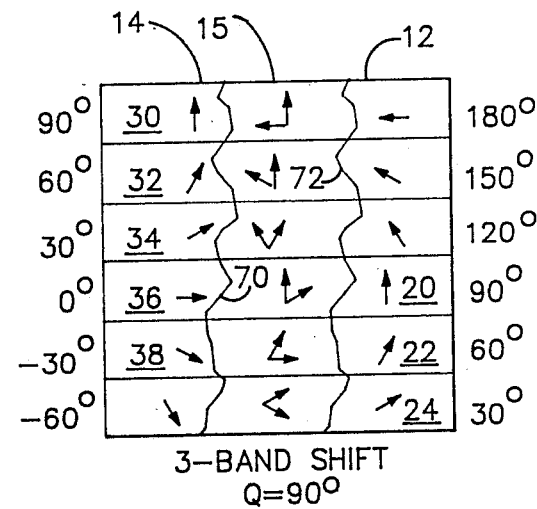
FIG.7 3-BAND SHIFT Q=90°
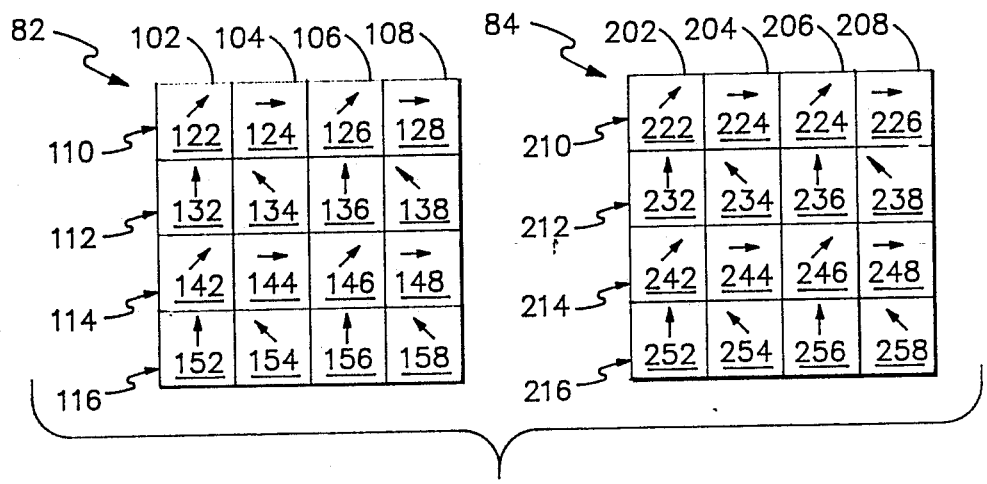
FIG.8
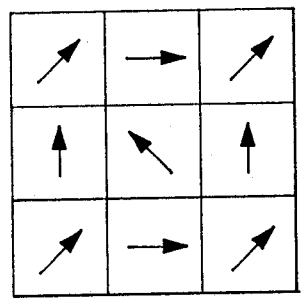
0-POSITION SHIFT Q=0°
FIG.9
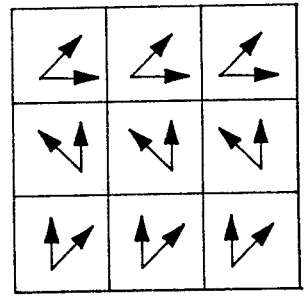
1-POSITION SHIFT Q=45°
FIG.10

1-POSITION VERTICAL
Q=15°

1-POSITION LATERAL
+1-POSITION VERTICAL
Q=90°

VARIABLE DENSITY LIGHT TRANSMITTING DEVICE

BACKGROUND OF THE INVENTION

The present invention is directed to a variable density light transmitting device and, more particularly, to a variable density light transmitting device comprising at least two layers wherein density variation is achieved through linear shifting of one layer relative the other layer.

The optical phenomenon known as polarization depends on the fact that each light wave vibrates in a plane which extends transversely to the direction of wave propagation. A beam of natural light contains a mixture of light waves vibrating in a plurality of different transverse planes oriented in a full 360° about an axis defining the direction of wave propagation. Certain materials exhibit a property known as "dichroism" meaning the property of differential absorption of the component waves of an incident beam of light depending upon the vibration direction of the component waves. A polarizer formed from a dichroic material may be used to selectively allow transmission of light waves vibrating in a direction parallel to the transmission axes of the polarizer while preventing transmission of light waves oriented in a direction perpendicular to the transmission axes. An early commercially viable form of polarizer invented by Edwin H. Land in 1928, consists of a thin layer of tiny needle-like dichroic crystals of herapathite, in parallel orientation, embedded in a plastic matrix and enclosed for protection between two transparent plates. A modification, developed by Land in 1938 and known as H-Sheet, is a molecular polarizer. It consists of long polymeric molecules of polyvinyl alcohol (PVA) that has been given a preferred direction by stretching and have been stained with an ink containing iodine that causes the sheet to exhibit dichroism. The PVA sheet is laminated to a support sheet of cellulose acetate butyrate. The existence of relatively low cost polaroid sheets formed by the process developed by Land and other similar processes, has resulted in applications for polarizers in numerous different optical apparatus. Two of the more common uses are for sunglass lenses and defraction gradiants for camera lenses. Due to the fact that light transmitted through a polarizing layer is linearly oriented or "polarized", it is possible to change the amount of transmission of light through a variable density device consisting of two polarizing layers by rotation of one polarizing layer which respect to the other polarizing layer. In a light beam passing through a first polarizing layer and then through a second polarizing layer, the amount of light transmitted through the second polarizing layer may vary from a maximum amount of light equal to that transmitted through the first polarizing layer when the transmission axes of both layers are parallel to theoretically no light transmission whatsoever, i.e. total extinction, when the transmission axes of the two polarizing layers are positioned perpendicular to one another. The mathematically expression for this relationship was discovered, experimentally, by Etienne Louis Malus in 1809, and is known as Malus Law. Malus Law is expressed as $I = I_{max} COS^2 Q$, where I is the amount of light transmitted through the second layer, $I_{max}$ is the amount of light transmitted through the first layer, and Q is the angle between the transmission axis of the first layer and the transmission axis of the second layer. The advantage of variable density light transmission for sunglasses, through the use of two polarized layers which are rotatable with respect to one another, was recognized by E. H. Land in U.S. Pat. No. 2,005,426, the disclosure of which is hereby incorporated by reference. A number of other adjustable sunglasses wherein the light density is adjusted by rotation of one polarizing layer with respect to another polarizing layer, are described in U.S. Pat. Nos. 2,298,058; 2,773,422; 3,423,149; 3,944,346; 4,264,154; and 4,386,832 which are all hereby incorporated by reference. These subsequent patents deal with various mechanisms for rotating one eyeglass lens with respect to another eyeglass lens and, in some cases, deal with the use of differential color absortive or differential color polarizing lenses.

A problem with all such prior art sunglasses and with such means of varying light density in general, is that the shape of the light transmissive layers must generally be limited to a circular or near-circular shape in the area where variable density is to be achieved. Such circular shapes are generally not desirable in all sunglasses and in other potential applications for a variable density light transmission device such as, for example, windows. Another problem is that a relatively large angle deflection of one layer relative to the other layer is necessary to achieve a significant change in light transmission. The human eye perceives light logarithmically and thus even a 50% transmission reduction produced by 45° rotation of one layer relative the other layer may seem to be a relatively small change in light transmission to the users of such glasses. A problem associated with the large angle deflections in the case of sunglasses is that a lens portion for each eye must be rotated by the same amount simultaneously. Mechanism for producing such coordinated large angle deflections in two separate lenses have been either awkward or expensive and have limited the practical application of such prior art variable density sunglasses.

It would be generally desirable to provide a device capable of achieving the variable density light transmission described in the above cited patents without requiring circular lens portions or cumbersome large angular displacements of one polarizing layer relative to another polarizing layer.

OBJECT OF THE INVENTION

It is an object of the present invention to provide a variable density light transmitting device.

It is a further object of the invention to provide a variable density light transmitting device comprising at least two layers each having a plurality of polarizing areas with differently oriented transmission axes which layers may be moved relative one another to vary the density of light transmitted therethrough.

It is a further object of the invention to provide a variable density light transmitting device which may be used in eyeglasses.

It is a further object of the invention to provide a variable density light transmitting device which may be used in camera or projector shutters.

It is a further object of the invention to provide a variable density light transmitting device which may be used in rear view mirrors.

It is a further object of the invention to provide a variable density light transmitting device which may be used in goggles including welding goggles.

It is a further object of the invention to provide a variable density light transmitting device which may be used in high speed light control devices such as explosive flash eye protection shields.

It is a further object of the invention to provide a variable density light transmitting device which may be used in all manner of windows for variable light adjustment and/or for total black out of light for privacy.

It is a further object of the invention to provide a variable density light transmitting device which may be used in all applications of existing variable density light transmitting devices.

SUMMARY OF THE INVENTION

The present invention includes a variable density light transmitting device having at least two light transmitting sheets or layers which are in one embodiment linearly movable and in another embodiment rotatingly movable with respect to one another to produce variations in the amount of light transmitted through the layers. Each of the two layers has a polarizing zone which includes a number of different polarizing areas. Each polarizing area has parallel light transmission axes therewithin. However, the transmission axes angle of orientation with respect to a common reference axis are different in some of the polarizing areas from the angle of orientation in other of the polarizing areas of any polarizing zone. The arrangement of the polarizing areas within the polarizing zones of each layer are such that polarizing areas on different layers having parallel oriented transmission axes may be positioned opposite one another in one alignment position of the two layers to allow a maximum amount of light transmission through the two layers. The arrangement of the polarizing areas is also such that in at least one other alignment position of the two layers, polarizing areas with non parallel transmission axes are positioned opposite one another to provide an amount of light transmission through the two layers which is less than the maximum amount and which is uniform throughout the overlying polarizing zones of the layers.

In one embodiment of the invention, each polarizing zone consists of a series of parallel linearly extending polarizing bands. In another embodiment of the invention, each polarizing zone consists of a gridwork of polarizing squares. In another embodiment of the invention each polarizing zone comprise a generally circular shape divided into equal angle generally triangular or "pie-shaped" circle portions which comprise different polarizing areas.

Thus, the invention may include a variable density light transmitting device comprising a first light transmitting layer having a plurality of light polarizing areas with differently oriented transmission axes; a second light transmitting layer overlying said first light transmitting layer and movable relative said first layer while remaining generally parallel to said first layer, said second light transmitting layer having a plurality of light polarizing areas of differently oriented transmission axes of corresponding size and arrangement to said light polarizing areas on said first light transmitting layer; said light polarizing areas on said first layer being selectively positionable opposite different ones of said light polarizing areas of said second layer by relative movement of said first layer with respect to said second layer; whereby variable density light transmission is provided through said first and second layers by said relative movement.

The invention may also include a first light transmitting layer having a plurality of light polarizing areas with differently oriented transmission axes; a second light transmitting layer overlying said first light transmitting layer and linearly movable relative said first layer in a direction generally parallel to said first layer, said second light transmitting layer having a plurality of light polarizing areas of differently oriented transmission axes of corresponding size and arrangement to said light polarizing areas on said first light transmitting layer and being selectively positionable opposite different ones of said light polarizing areas of said first layer by relative linear movement of said first layer; whereby variable density light transmission is provided through said first and second layers by said relative linear movement; mounting means for holding said first layer and said second layer in generally parallel relationship; said first light transmitting layer comprising a first polarizing zone having a plurality of adjacent, equal width light polarizing bands; each band having parallel light transmission axes therewithin; the angle of orientation of said transmission axes of each band being such that the difference between said angles of orientation of the transmission axes of any two adjacent bands is substantially a constant value throughout said first polarizing zone; said second light transmitting layer comprising a second polarizing zone substantially identical to said first polarizing zone and positionable opposite thereto; said first light transmitting layer being relatively linearly movable with respect to said second light transmitting layer in a direction generally parallel to said layers and perpendicular to the direction of said light polarizing bands; said first light transmitting layer having a first position wherein a first light polarizing band is said first polarizing zone is positioned opposite a second light polarizing band in said second light polarizing zone wherein the difference between the angles of orientation of the transmission axes of said first band and said second band is a first value; said first light transmitting layer having a second position wherein said first light polarizing band is positioned opposite a third light polarizing band in said second zone wherein the difference between the angles of orientation of the transmission axes of said first band and said third band is a second value which is not equal to said first value.

The invention may also include a first light transmitting layer having a plurality of light polarizing areas with differently oriented transmission axes; a second light transmitting layer overlying said first light transmitting layer and linearly movable relative said first layer in a direction generally parallel to said first layer, said second light transmitting layer having a plurality of light polarizing areas of differently oriented transmission axes of corresponding size and arrangement to said light polarizing areas on said first light transmitting layer and being selectively positionable opposite different ones of said light polarizing areas of said first layer by relative linear movement of said first layer; whereby variable density light transmission is provided through said first and second layers by said relative linear movement; mounting means for holding said first layer and said second layer in generally parallel relationship; said first light transmitting layer comprising a first polarizing zone having a gridwork of adjacent polarizing squares, said squares in said gridwork being arranged in longitudinally extending columns and laterally extending rows; said polarizing squares having a plurality of differently oriented transmission axes arranged in a predetermined array; said second light transmitting layer having a second polarizing zone substantially identical to said first polarizing zone and positionable opposite thereto; said polarizing squares in said polarizing zones being arranged in an array permitting a first uniform density light transmission through said two zones in a first alignment position of said two layers, a second uniform density light transmission less dense than said first density light transmission in a second alignment position, and a third uniform density light transmission less dense than said second density light transmission in a third alignment position; said first and second layers being linearly movable between said first and second and third alignment positions.

The invention may also include a variable density light transmitting device comprising a first light transmitting layer having a plurality of light polarizing areas with differently oriented transmission axes; a second light transmitting layer overlying said first light transmitting layer and rotatably movable relative said first layer about an axis oriented generally perpendicular to said layers, said second light transmitting layer having a plurality of light polarizing areas of differently oriented transmission axes of corresponding size and arrangement to said light polarizing areas on said first light transmitting layer; said light polarizing areas on said first layer being selectively positionable opposite different ones of said light polarizing areas of said second layer by relative rotational movement of said first layer with respect to said second layer; whereby variable density light transmission is provided through said first and second layers by said relative rotational movement.

BRIEF DESCRIPTION OF THE DRAWING

FIGS. 2-7 are partial frontal views, partially cutaway, of the polarizing layers shown in FIG. 1 which are arranged in different relatively linearly shifted relationship in a single shifting direction.

FIG. 8 is a frontal view of the first and second polarizing layer portions of a variable density light transmission device illustrating the use of a gridwork arrangement of polarizing areas.

FIGS. 9-12 illustrate various rectilinearly shifted positions of the polarizing layers illustrated in FIG. 8.

DETAILED DESCRIPTION OF THE INVENTION

Figure 1:
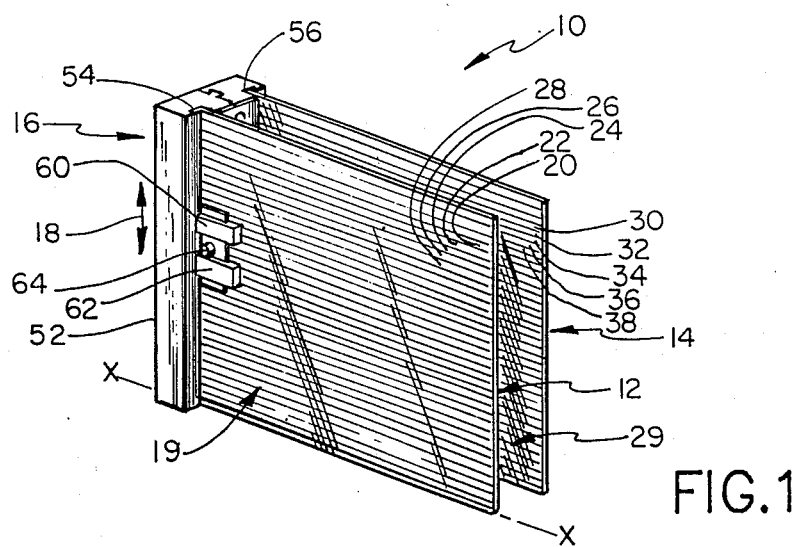
FIG. 1 is a perspective view of a pair of relatively linearly movable polarizing layers of the present invention.

As illustrated in FIG. 1, the variable density light transmitting device 10 of the present invention in general comprises a first generally flat sheet or layer of polarizing material 12 and a second layer of polarizing material 14 mounted in generally parallel relationship within a mounting device 16 which permits linear movement of one layer with respect to the other layer such as in the vertical direction as indicated at 18. The layers are shown separated by a relatively large space for purposes of illustration, but in actual use, would be positioned in close, nearly touching contact. Each sheet comprises a plurality of polarizing areas having transmission axes with different angles of orientation with respect to a fixed reference axis such as XX. By selective opposite alignment of different polarizing areas of the two sheets, different amounts of light transmission through the two layers are achieved. In the preferred embodiment described below, the different light polarizing areas on each layer are constructed and arranged such that in selected alignment positions, the amount of light transmission through any opposite portions of the two layers will be constant across the entire light transmitting area of the layers. In the embodiments illustrated generally in FIGS. 1-7 and 13, a shift in alignment of layers 12 and 14 causing a change in transmission density of the device 10 is achieved through movement of layer 12 in one linear direction, as indicated at 18. In the embodiments illustrated in FIGS. 8-12 and 14, different transmission densities are achieved through linear movement of the opposite layers in more than one direction as illustrated at 371 and 373 in FIG. 14. In the case of transmission density variation through linear movement in a single direction, the different polarizing areas on each layer are arranged in parallel bands 20, 22, etc. and 30, 32, etc. as illustrated in FIG. 1. In the case of transmission density variation achieved through linear movement in multiple directions, the different polarizing areas 122, 124, etc. and 222, 224, etc. on each layer are arranged in a rectangular gridwork as illustrated by FIG. 8. Having thus described the invention in general, various embodiments of the invention will now be described in detail.

As illustrated in FIG. 1, the first light transmitting layer 12 of the device may comprise a polarizing zone covering the entire area of the first layer and comprising a series of adjacent equal widths laterally extending polarizing bands 20, 22, 24, 26, 28, etc. The second layer may comprise an identical second polarizing zone having polarizing bands 30, 32, 34, 36, 38, etc. of identical construction and arrangement to those of the first layer 12. In the embodiment illustrated, the mounting means 16 may comprise a pair of oppositely positioned channel members 52 (only one shown). Each channel member comprising a first longitudinally extending groove 54 adapted to slidingly accept the first layer 12 and a second longitudinally extending groove 56 adapted to fixedly hold the second layer 14 in conjunction with suitable fastening means such as adhesive rivets or the like (not shown). The first layer 12 is adapted to have at least two alignment positions whereat polarizing bands on the first layer are positioned directly (perpendicularly) opposite polarizing bands on the second layer 14; i.e. any light ray passing perpendicularly through a band on the first sheet will also pass through the corresponding band on the second sheet. One structure for achieving this exact alignment in at least two positions is illustrated in FIG. 1 as a pair of parallel stop members 60, 62 mounted on channel member 52 and adapted to engage a stud member 64 mounted on movable layer 12 at a position between the two stop members. The spacing between the stop members and the dimension of the stud is such that an exact alignment of opposite polarizing bands is provided when the stud member is positioned in engagement with one of the stop members, and another exact alignment is provided when the stud is engaged with the other stop. Thus, for example, the distance between stops may be two band width and the stud may have a diameter of one band width to achieve a one band shift.

Figure 2:
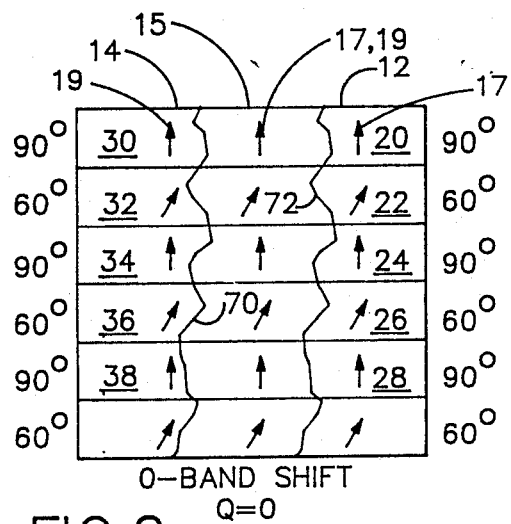
Figure 3:
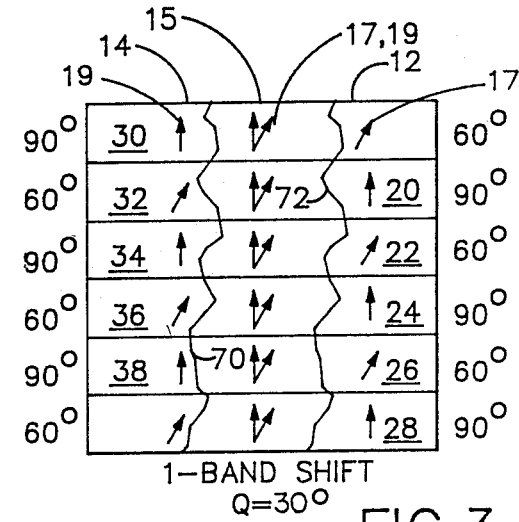
Figure 4:
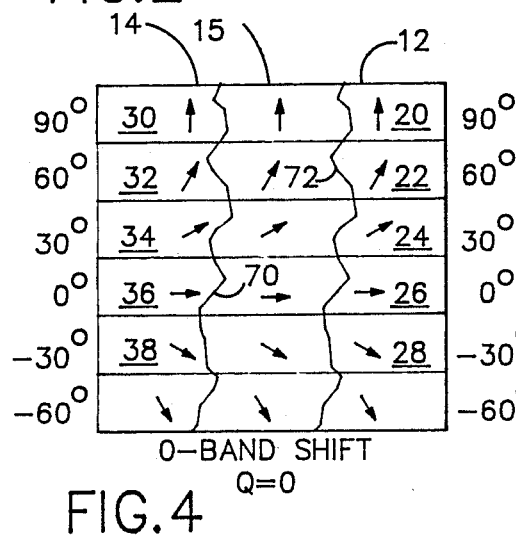

A first transmission axis configuration for the polarizing bands of a variable density light transmitting device such as shown in FIG. 1, is illustrated in Figs. 2 and 3. In these figures, the forwardly positioned movable layer 12 is shown broken away at a left edge 70 and the fixed rearwardly positioned layer 14 is seen through layer 12 to be broken away at a right edge 72 thereof for the purpose of showing the transmission axis orientation as indicated by arrows 17, 19 in each of the bands of the two different layers in various alignment positions. The central portion indicated as 15 shows the relative angle between the two transmission axes (17, 19) in each set of overlapping bands of the two layers. In FIGS. 2 and 3, transmission axes orientation of adjacent bands alternate between 90° and 60°, i.e. the transmission axes in band 30 is 90°, in band 32 is 60°, in band 34 is 90°, in band 36 is 60°, etc. As illustrated in FIG. 2, in a first position of movable layer 12 all of the 90° bands and all of the 60° bands of the two layers 12, 14 are aligned and, thus, the angle between the transmission axes of each opposite pair of bands, as indicated at 15, is 0. As indicated at FIG. 3, when the first layer 12 is moved downwardly one band width such that, e.g. band 20 of layer 12 is aligned with band 32 of layer 14, then the angle Q made by the differently aligned transmission axes of each opposite pair of bands is equal to the difference between 90° and 60° which equals 30°. It may be seen that the same angle Q is provided between the transmission axes of every opposite pair of bands in this arrangement and, thus, the light transmission over the entire area of the two layers is generally constant for any position where opposite bands are exactly aligned.

Figure 5:
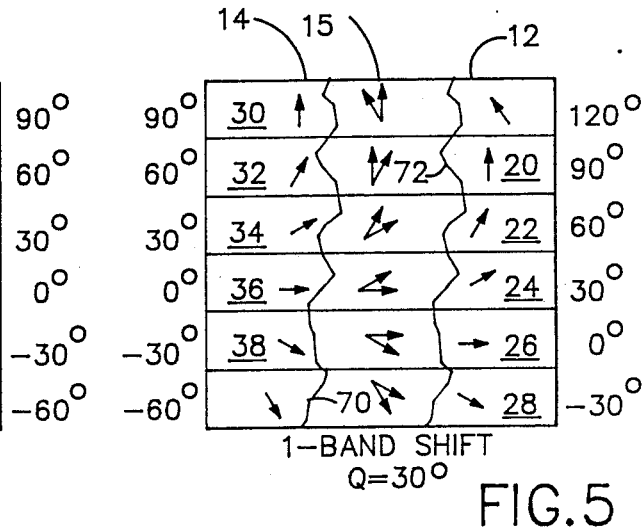

FIGS. 4-7 illustrate another parallel band configuration for two oppositely positioned light transmitting layers 12, 14. In this embodiment, each downwardly proceeding band has a transmission axis with an angel of orientation with respect to a fixed axis XX which is a constant angular amount smaller than the angle of the transmission axis of the immediately proceeding band. In the specific embodiment shown in FIGS. 4-7, the angular orientation of bands 20, 22, 24, 26, 28, etc. in layer 12 may be 90°, 60°, 0°, −30°, −60°, etc. in decreasing angles of 30° with layer 14 having bands of identical arrangement and transmission axes orientation. It will be appreciated that by selection of an increment such as 30° which is evenly divisible into 360°, that the series of alignment positions of the transmission axis will repeat at regular intervals. It may be seen from the present example that an alignment of −90°, i.e. straight down, is the equivalent of an alignment of +90°, i.e. straight up, and, thus, the series 90°, 60°, 30°, 0°, −30°, −60° begins repeating itself in the next set of bands, i.e. −90° equals; +90° −120° equals +60°; −150° equals +°, etc. Thus, in constructing an arrangement such as illustrated in FIGS. 4-7, strips of only six different transmission axes orientations need be provided. In the orientation illustrated in FIG. 4, in which bands, e.g. 20, 30; 22, 32, etc. having transmission axes of the same angles of orientation are positioned opposite one another, the angle Q between the transmission axes is, of course, 0 and maximum light transmission is achieved. As illustrated by FIG. 5, when the layer 12 is shifted downwardly one band width, the angle Q between oppositely positioned bands, e.g. 20, 32; 22, 34, etc. is each 30°. As illustrated in FIG. 6, when layer 12 is shifted two band widths downwardly, oppositely positioned bands of the two layers have transmission axis positioned at an angle Q of 60° and when layer 12 is shifted three positions downwardly, as illustrated in FIG. 7, the angle Q between transmission axes of opposite bands if 90° causing complete extinction of light transmission. Thus, it may be seen that by providing layers having bands with transmission axes angles of orientation which are succeeding smaller by equal amounts, that linear shifting movement between the two layers to various alignment positions produces an angle Q between opposite transmission axes equal to the number of band width shifts multiplied by the angular difference between adjacent bands on each sheet. In the embodiments illustrated in FIGS. 4-7, the position shown in FIG. 4 allows a light transmission through the second layer of substantially 100% of that transmitted through first layer; the position of FIG. 5 (Q=30°) allows a transmission through the two layers of approximately 75% of that transmitted by the first layer; the position of FIG. 6 (Q=60°) allows a transmission through the two layers of approximately 25% of that transmitted by the first layer; the position of FIG. 7 allows a transmission through the two layers of approximately 0% of that transmitted by the first layer. Thus, the FIGS. 4-7 represents a progression from the maximum amount of light possible to a total elimination of light transmission through the two layers.

In the shifting arrangements described above, the angles between adjacent bands on each of the layers, i.e. 30° in the case of FIGS. 4-7, is fairly substantial and a person viewing through the transmission device would probably notice a zone of darker color proceeding downwardly from one band border to the next band border as layer 12 is shifted downwardly. If the opposite layers 12, 14 were not positioned such that the bands were directly perpendicularly opposite one another, bands of altering degrees of darkness would be noticed across the viewing surface. In the embodiment illustrated in FIG. 13, the horizontal bands comprise a very small band width, e.g. one half millimeter and the difference between angles of orientation of the transmission axes of adjacent polarizing bands is relatively small, e.g. 5°. In such an arrangement, lines associated with movement of one layer with respect to another layer, are considerably less distinguishable by an observer. In fact, since the human eye perceives changes in the amount of light transmitted in a logarithmic manner, the viewing surface will appear to be a substantially continuous shade of color throughout the entire area even when bands are not positioned perfectly opposite one another. Such an arrangement also allows a considerable change in light transmission density through the two layers to be achieved with a relatively small distance linear shift, i.e. if the band width is one half millimeter and the angular orientation difference between transmission axes of adjacent bands if 5°, then a 50% light reduction (Q=45°) can be achieved through a shift of 4.5 millimeters and a total blackout can be achieved through a shift of only 9 millimeters. Of course, a total blackout is probably not desirable in sunglasses and thus stops may be provided to limit the linear movement of the first band relative the second band, a predetermined amount.

Figure 13:
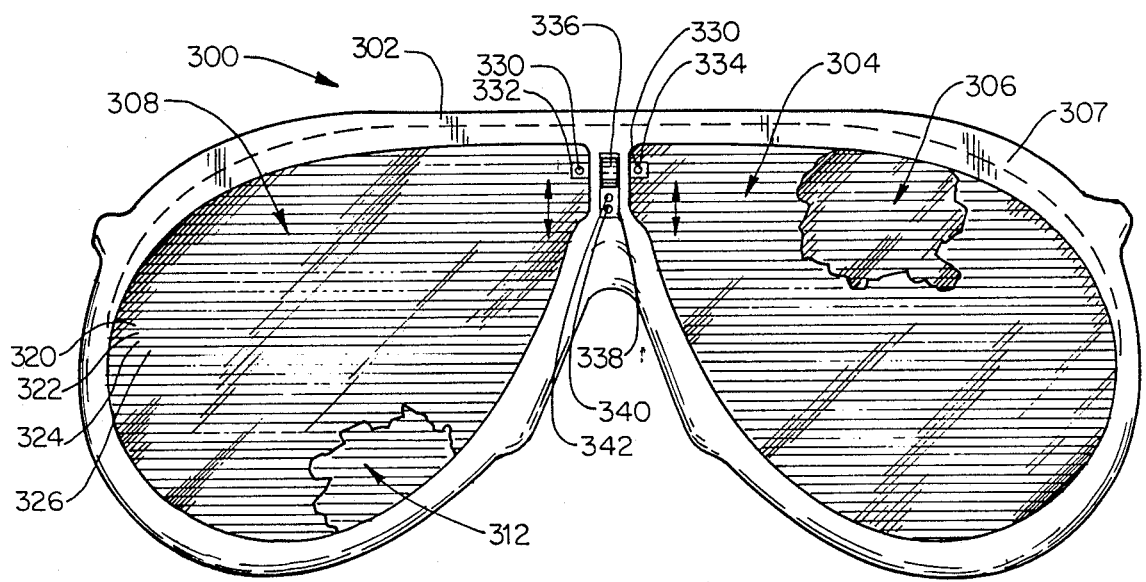
FIG. 13 is a frontal, partially cut-away view of sunglasses having variable density light adjustment achieved through vertical movement of the forward lens portions of the sunglasses.

In the specific embodiment illustrated in FIG. 13, an opthalmic mounting means such as sunglass frames 300, having a non-circular peripheral lens frame 302, support a first outwardly positioned layer 304 and a second inwardly positioned layer 306 in the portion of the frame corresponding to the viewing area of the left eye of a user with a third layer 308 and a fourth layer 310 provided in identical fashion in the area of the frame corresponding to the viewing area of the right eye of a user. The layers 304, 306, 308, 310 may comprise a meniscus configuration of the type presently used in most glasses, i.e. a slightly curved shape rather than a true planar shape. In applying the phrase "flat" or "generally flat" to layers 12, 14, etc. throughout the application, it will be understood that "flat" or "generally flat" is intended to include such meniscus shapes and other moderate variations from a true planar shape. Identical width laterally extending bands 320, 322, 324, 326, etc. are provided in each of the first, second, third and fourth layers which may be, e.g. one half millimeter in band width. The transmission axes of adjacent bands are preferably of constantly decreasing value from top to bottom within each layer in relatively small increments, e.g. 5°. A cross member 330 is provided connecting upper portions of each of the outer (first and third) layers 304, 308 by suitable attachment means such as rivets 332, 334 adhesive or the like. The cross member 330 may be fixedly attached to a hand actuated slide piece 336 positioned in a vertically aligned slide groove 338 enabling the first and third layers 304, 308 to be moved simultaneously in equal amounts relative the second and fourth layer 306, 310, respectively. It may be desirable to provide one or more selectable movement positions between an upwardly positioned maximum light transmission position and a downwardly positioned minimal light transmission position and such various positions may be provided by detentes 340, 342 in a planar surface positioned beneath the slide piece and a suitable detente ball assembly (not shown) provided in the slide piece or other well known selectable stop devices might also be employed. As shown by the broken areas in FIG. 13, the peripheral frame 302 of the opthalmic mounting means may be provided with a sufficient recess portion 307 to enable variable vertical movement of the first and third layers 304, 308 therewithin.

Figure 11:
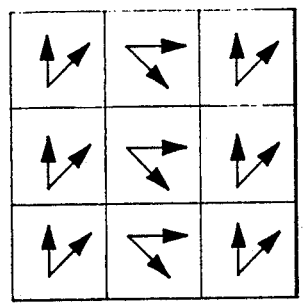
Figure 12:
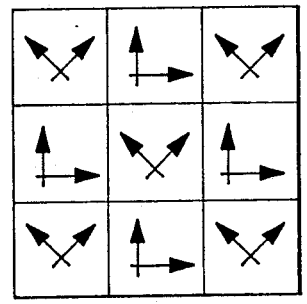

A device for varying light transmission by relative movement of two generally parallel light transmitting layers in two different linear directions will now be described with reference to FIGS. 8–12 and 14. As illustrated in FIG. 8, the variable density light transmission device 11 of a type shown in FIG. 14 may comprise a first layer 82 and a second layer 84 each having a gridwork pattern thereon consisting of a plurality of light transmitting squares arranged in adjacent columns 102, 104, 106, 108 with respect to the first layer and 202, 204, 206, 208 with respect to the second layer. The gridwork also defines a plurality of adjacent rows 110, 112, 114, 116 with respect to the first layer and 210, 212, 214, 216 with respect to the second layer. Various squares 102, 124, etc. 222, 224, etc. within the gridworks are arranged such that for any column the angle of orientation of the transmission axes of squares within alternate rows are identical and within adjacent rows are different. The transmission axes angles or orientation of each square within a given row are such that the transmission axes of squares in alternating columns of a gridwork are the same and the angles of orientation of transmission axes of squares in adjacent columns are each different. For example, squares 122 and 126 may have a transmission axes angle of orientation of 45° and squares 124 and 128 may have axes oriented at 0°. Squares 122 and 142 may be at 45° and 132 and 152 may be 90°. Square 152 and 156 may be at 90° and square 154 and 158 may be at 135°. Square 124 and 144 may be at 0° and square 134 and 154 may be at 135°. In such an arrangement, it will be appreciated that when the gridwork of layer 82 is positioned over the gridwork of layer 84, all of the transmission axes of the various squares will be parallel. When the gridwork of layer 82 is shifted one position to the right, as illustrated in FIG. 10, the angle between each of the oppositely positioned squares transmission axes will be 45°. When, as shown in FIG. 11, layer 82 is shifted one position downwardly from the centered position, each of the oppositely positioned squares will again have transmission axes oriented at an angle of 45°. When layer 82 is shifted one position laterally and one position vertically, as shown in FIG. 12, opposite pairs of squares have transmission axes angles of orientation of 90° permitting no transmission of light.

Figure 14:
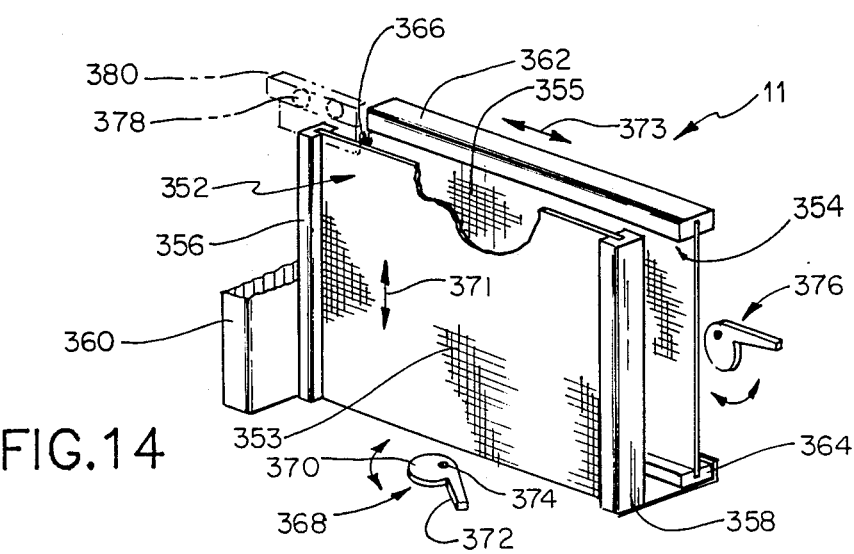
FIG. 14 is a schematic, partially cut-away perspective view of a window device for achieving variable density light transmission through linear displacement in two different perpendicular directions.

Apparatus for causing the shifting described above with reference to FIGS. 8–12 is illustrated in FIG. 14 as having a first layer 352 with a first gridwork 353, a second layer 354 with a second gridwork 355 mounted in parallel relationship to the first layer. The first layer 352 is slidably mounted in opposite vertical slide support frame members 356, 358 and is biased by gravity in the downward position illustrated. The vertical members 356, 358 may, in turn, be mounted in a window casement 360 or other conventional frame means. Horizontal slide frame members 362, 364 may also be mounted in the casement and may slidably receive second layer 354 therewithin. In the embodiment illustrated, a spring assembly 366 biases the second layer 354 toward a position to the right of the page as shown in the drawing. A vertical movement assembly 368 including a cam portion 370 adapted to engage a peripheral edge surface of the first layer and attached to a lever 372 is mounted on horizontal pivot axis 374, which is attached to a portion of the surrounding frame (not shown). By moving the lever 372 from the position shown to a substantially vertically oriented position, the first layer may be shifted upwardly a distance equal to the dimension of one square of the gridwork. A similarly constructed horizontal movement assembly 376 may be used to shift the second layer 354 laterally in a direction to overcome the bias of spring 366 a distance equal to the width of one square of the gridwork. Thus, it may be seen that through selective actuation of the two movement assemblies 368, 376, variable vertical and lateral shifting of the gridworks 353, 355 with respect to one another may be achieved. Thus, through selection of a gridwork pattern such as that discussed above with respect to FIGS. 8–12, three different light transmission densities may be selected.

In the embodiment of FIG. 14 discussed above, the first layer 352 was moved vertically and the second layer 354 was moved horizontally. It would also be possible, of course, to hold one layer such as the second layer 354 fixed while moving only the first layer 352 in both an upward and horizontal direction. One structure for achieving this result is formed by mounting the two vertical members 356, 358 in a horizontally disposed guide track 380 as by a roller assemblies 378 (only one shown) and by providing biasing means and horizontal movement means such as spring 366 and assembly 376 in conjunction with the frame structure 356, 358 to enable selected horizontal movement thereof relative the second layer. The vertical movement of the first layer relative the second layer may be in the manner previously discussed. Thus, both horizontal and vertical relative displacement of the two layers is accomplished by moving a single layer.

Figure 15:
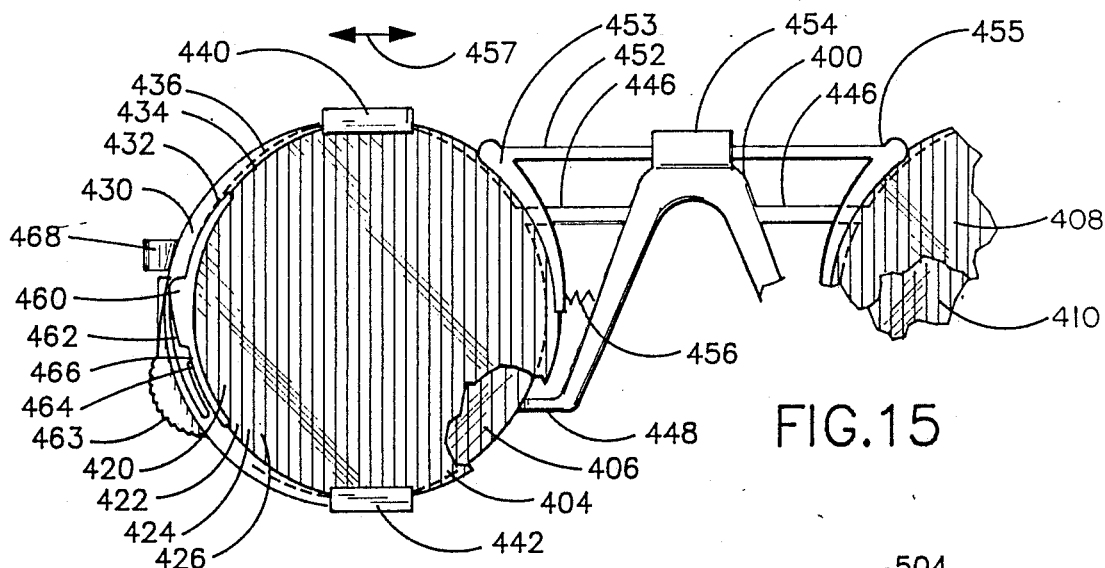
FIG. 15 is a frontal, partially cut-away view of sunglasses having variable density light adjustment achieved through lateral movement of the forward lens portions of the sunglasses.

In another sunglass embodiment of the invention illustrated in FIG. 15 an opthalmic mounting means such as sunglass nosepiece 400 is used to support a first, outwardly positioned layer 404 which overlays a second, inwardly positioned layer 406 adapted to be positioned in front of a person's right eye. Nosepiece 400 also supports a third, outwardly positioned layer 408 overlaying a fourth, inwardly positioned layer 410 adapted to be positioned in front of a person's left eye. The layers in the embodiment shown have a circular shape but might comprise any shape useful for sunglasses. Each of the four layers 404, 406, 408, 410 comprise equal width vertically extending bands e.g. 420, 422, 424, 426, etc., on layer a 404; and 430, 432, 434, 436, etc., on layer 406. These bands each comprise separate polarizing areas which may have polarizing axes arranged to provide two different light densities when shifted laterally as described above with reference to FIGS. 2 and 3, or which may be constructed and arranged to provide multiple different light densities therethrough as described above with reference to FIGS. 4-7. Coupling means such as U-shaped channel members 440, 442 which are fixedly attached to an associated inner layer 406 and which have a channel slot adapted to allow lateral sliding movement of an associated outer layer 404 received therein may be provided as illustrated at the upper and lower portions of each set of overlying layers (couplings for left eye layers not shown). Of course totally encircling frames or other devices adapted to enable lateral shifting movements of the outwardly positioned layers 404, 408 with respect to associated inwardly positioned layers 406, 410 may also be used. In the illustrated embodiment a pair of post members 446, 448 fixedly attached each inwardly positioned layer 406 to the sunglass nosepiece 400. An actuator rod 452 which is fixedly attached to the outwardly positioned layer 404 by an arcuate coupling rim 453 is received within a sleeve member 454 fixedly attached to the upper portion of nosepiece 400. An end of the actuator rod 452 opposite the one attached to outwardly positioned layer 404 is attached to outwardly positioned layer 408 by rim 455 whereby lateral shifting movement, as indicated at 457, of layer 404 causes corresponding lateral shifting movement of layer 408. A biasing means such as spring 456 attached between the nosepiece 400 and outwardly positioned layer 404 bias the outwardly positioned layer 404 in a lateral direction away from the nosepiece 400. Lateral shifting means are provided on layers 404, 406 to enable a selected amount of relative lateral movement of the outer layer 404 with respect to the inwardly positioned layer 406. The lateral shifting means may comprise a fixed wedge 460 attached in non-moveable relationship to the lateral edge of the outwardly positioned layer 404 and a movable wedge 462 with thumb grip 463 slidingly mounted on a lateral peripheral portion of the fixed inner layer 406 at a position so as to engage the other wedge 460. Relative upward movement of movable wedge 462 causes movable layer 404 to be displaced laterally towards the nosepiece 400. When movable wedge 462 is moved downwardly biasing spring 456 urges the movable layer 404 in a direction away from nose piece 400. Stop means may be provided to limit the upward movement of movable wedge 462 and may comprise an outwardly extending nub 464 on the movable wedge which is adapted to engage a right angle shoulder portion 466 of the fixed wedge 460. The stop means is constructed and arranged so as to correspond with an alignment position of the layers 404, 406 and also of layers 408, 410 in which vertical bands on one layer are positioned directly opposite vertical bands on the other layer. Stop means for limiting the movement of the outer layer in the outward direction may also be provided such as, for example, glasses post 468 which is fixedly attached to layer 406 and which may stoppingly engage a peripheral portion of movable layer 404.

It may be seen from the above that the disadvantages associated with rotational movement of one polarized layer with respect to an opposite polarized layer to achieve variations in light transmission density is overcome by the present invention. The degree of movement necessary to achieve any particular reduction of light transmission is a function of the dimensions of the particular band pattern or gridwork used and is also a function of the angle of orientation of the transmission axes of different polarizing areas of a particular sheet. Thus, by proper choice of these values, a predetermined amount of light transmission density per unit of linear displacement may be achieved.

It would of course be possible to use more than two layers in overlaying relationship to further vary the light density transmitted through the layers through relative movement of the additional layers.

Embodiments of the invention in which variable density light transfer is achieved through rotational movement of one light transmissive layer with respect to another light transmissive layer are illustrated in FIGS. 16-19. In each of these embodiments a first layer and a second layer, which is identical to the first layer, are positioned in overlaying relationship and connected by a coupling means which allows rotational movement of the first layer with respect to the second layer about an axis which passes through a center point of each layer in a direction perpendicular to both layers. Each of the layers may comprise a circular shape or may also comprise a polygonal shape which is divided into a plurality of equal angle radially extending portions i.e. triangular, "pie-shaped" portions. In the embodiment illustrated in FIGS. 16-19 adjacent pie-shaped portions of each layer have transmission axes oriented at different angles, however the angular difference between the transmission axes orientation in adjacent portions is constant throughout each layer, i.e. if the difference in angles between the transmission axes in the first pie-shaped portion and second pie-shaped portion of a layer is 15° then the difference in the transmission axes orientation between the second and third portion or third and fourth portion, etc. will also be 15°. By selecting the appropriate angular size for the pie-shaped portions and by choosing an appropriate amount of angular change from one pie-shaped portion transmission axes orientation to the next pie-shaped portion transmission axes orientation the density of light transmission through the two layers may be caused to change in uniform increments through rotational movement of the first layer with respect to the second layer. Whereas in traditional variable density devices in which one polarized layer is rotated with respect to another polarized layer and the change in light transmission between maximum light transmission and total light annihilation takes place through a 90° relative rotation of the layers, the amount of rotation required for light density variations with the present invention as embodied in FIGS. 16–19 may be designed to occur very quickly i.e. over a relatively small rotational change such as 10°, or may be caused to occur over a relatively larger scale rotational change such as 180°. The manner of achieving such selectable variations will now be described more specifically.

Figure 16:
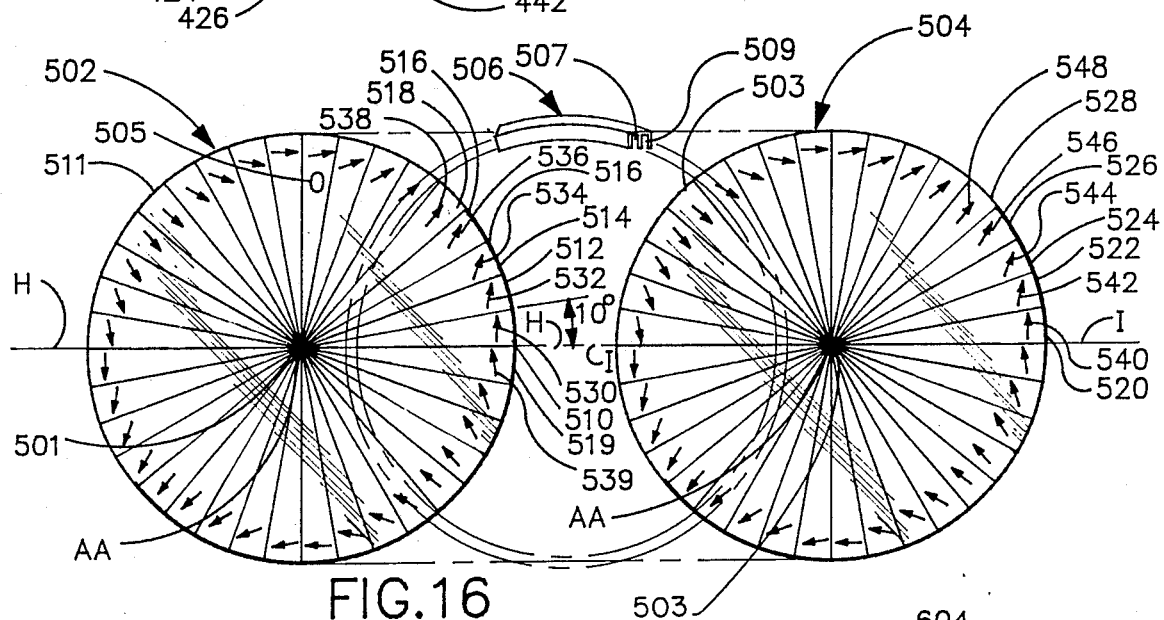
FIG. 16-18 are exploded, partially cut-away, perspective views of pairs of relatively rotatably movable polarizing layers of the present invention.

FIG. 16 is an exploded, partially cut away view of an embodiment of the invention in which rotation of a first circular layer 502 relative to a second coaxially aligned circular layer 504 causes variance in light density between a maximum light density position and a near total annihilation position over an angle of less than 90°. In this particular embodiment the light density shift from maximum light density to near total annihilation occurs over a 40° rotation of the first layer with respect to the second layer. The first layer 502 and the second layer 504 are of identical construction and are coupled together in a manner to allow rotational movement of the first layer 502 relative the second layer 504 about an axis AA passing through the centers 501, 503 of the two layers and perpendicular to the two layers. The coupling means may comprise an annular coupling ring 506 having two U-shaped channel cavities 507, 509 which receive peripheral portions 511, 513 of circular shaped layers 502, 504, respectively, therewithin. A perpendicularly outwardly projecting stud member 505 mounted near the outer periphery of layer 502 and positioned inwardly of the coupling member 506 may be provided as a handle to facilitate rotational movement of layer 502 relative layer 504. Layer 504 may be affixed to an adjacent surface of the coupling member channel 509.

Each layer 502, 504 is divided into a plurality of equal angle, generally triangular, pie-shaped portions 510, 512, 514, 516, 518, etc. on layer 502; and corresponding portions 520, 522, 524, 526, 528, etc. on layer 504. Each portion has a pair of borders which extend radially outwardly from the center 501, 503 of the associated layer 502, 504. In the embodiment of FIG. 16 the angle between the radially extending borders of each pie-shaped portion 510, 512, 514, 516, 518, etc., 520, 522, 524, 526, 528, etc. is 10°. Each pie-shaped portion has parallel transmission axes 530, 532, 534, 536, 538, etc., 540, 542, 544, 546, 548, etc. throughout the portion. The orientation of the transmission axes are indicated by a single arrow. The relatively rotated position of layer 502 in which the portions 510, 512, 514, 516, 518, etc. are oppositely aligned with the portions 520, 522, 524, 526, 528, etc. and wherein each of the oppositely positioned portions of the two layers e.g. 510, 520 have parallel oriented transmission axes e.g. 530, 540 will be referred to as the zero rotation position. In this position the intersection of the layers with a plane extending perpendicular to a lower radial boundary of pie-shaped portions 510 and 520 define reference axes HH, II on layers 502, 504, respectively. The relative rotated position of axis HH, with respect to axis II, will define the relative rotated position of layer 502 with respect to layer 504.

The relative angular position of transmission axes on each layer will be measured with respect to the associated reference axis HH or II. The angular position of the transmission axes in pie-shaped portion 510 and corresponding pie-shaped portion 520 with respect to associated reference axes HH and II is each 90°. The transmission axes 532, 534 angle of orientation in each of pie-shaped portions 512 and 522 is rotated 10° clockwise from that of the transmission axes 530, 540 of portions 510 and 520, respectively, i.e. the transmission aces 532, 542 in portions 512 and 522 are each positioned at an angle of 80° relative their associated reference axes HH and II. The angle of orientation of the transmission axes 534, 544 in pie-shaped portions 514 and 524 are rotated 10° with respect to those of adjacent circle portions 512, 522 such that the transmission axes 534, 544 are positioned at 70° relative the associated reference axes HH and II. This pattern of rotating the transmission axes 10° in each counterclockwise succeeding pie-shaped portion is continued through the entire 360° of each circular layer. It will be appreciated that since there are thirty-six equal pie-shaped circle portions in each layer and since the variance of the transmission axes angle of orientation in each succeeding portion is 10° that the thirty-sixth pie-shaped portion e.g. 519 (the portion adjacent to the first circular portion 510) will have a transmission axes 539 positioned at 10° counterclockwise to the transmission axes 530 of the first circular portion 510. Thus the number of divisions of the circle and the angular variance between transmission axes in adjacent pie-shaped circle portions have been chosen such that there is no discontinuity in the relationship between adjacent circular portions at any point within the circle. Phased somewhat differently, the series of angular displacements between circle portions is a periodic series having a period of 360°. As used here a period of 360° also includes periods which are integer divisions of 360° e.g. 180°, 120°, 90°, 75°, 60°, etc. It will also be appreciated that transmission axes which are positioned 180° apart, i.e. which are aligned in opposite directions, are identical.

Figure 19:
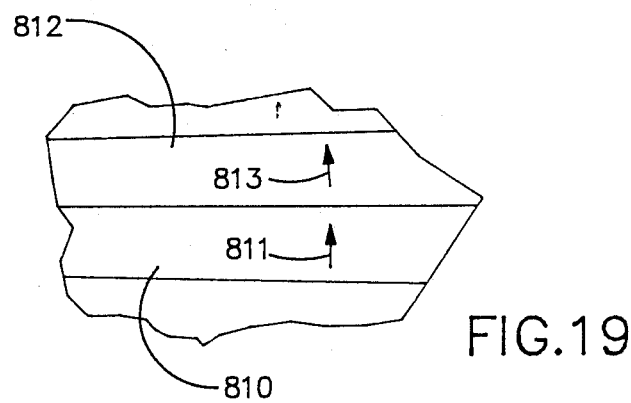
FIG. 19 is a partial frontal view of a relatively rotatably moveable polarizing layer of the present invention.

In operation layer 502 is rotated relative layer 504 through a series of discrete rotated alignment positions wherein the pie-shaped circle portions of layer 502 are oppositely aligned with the circle portions in layer 504 in each of the rotated positions. However, as explained above, if a layer is divided into very small polarizing areas with small increments of change in the transmission axes of orientation between adjacent areas, the effect of misalignment of the various portions becomes unnoticeable to the human eye. (A circle divided into 10° portions with 10° incremental change in transmission axis orientation in adjacent portions is used for illustrative purposes in FIG. 16 but as shown in FIG. 19 layers divided into much smaller, e.g. 1°, pie-shaped portions 810, 812, etc. having transmission axes 811, 813 oriented 1° apart would operate in the same manner as described in FIG. 16 and with less noticeable effect in misaligned positions of the two layers.) In a first alignment position in which reference axis HH of layer 502 is rotated 10° counterclockwise with respect to reference axis II of layer 504 circle portion 510 on the first layer is moved into alignment with circle portion 522 on the second layer. Due to the fact that circle portion 510 has been rotated relative reference axis II, the angle which circle portion 502 transmission axes 530 makes with reference axis II of the fixed layer 504 is changed from 90° to 110°. Since the transmission axes 542 of circle portion 522 of layer 504 is positioned at 80° with respect to reference axis II the angular difference between the transmission axes 530 and 542 becomes 20°. In the previous alignment position in which transmission axis 530 was aligned with axis 540 of circular portion 520 the angle between the two transmission axes was 0°; thus a 10° rotation has produced a 20° variation in the relationship between transmission axes. This relationship will hold with each of the pie-shaped circle portion of layer 502 and the aligned portions of layer 504 i.e. the angular displacement between the transmission axes of each pair of aligned circle portions on the two layers will be 20° in the rotated position of layer 502 in which axis HH is rotated 10° counterclockwise relative axis II. It may also be seen that each further counterclockwise 10° rotation of axis HH will produce a corresponding 20° shift between the aligned circle portions of the two layers i.e. a 20° rotation of axis HH produces a 40° angle between aligned transmission axes, a 30° rotation produces a 60° angle between transmission axes, a 40° rotation produces an 80° angle between transmission axes, and a 50° rotation produces a 100° displacement between transmission axes. By dividing the circle into a larger number of portions and choosing a relatively smaller shift between adjacent circle portions e.g. dividing the circle into 1° segments and displacing the transmission axes between adjacent circle portions by only 1°, as illustrated in FIG. 19, the displacement between transmission axes caused by relative rotation of the layer occurs at the same rate with respect to rotational change, however, there are a greater number of alignment positions which may be selected with a fine graduation in light density change between alignment positions. Thus it may be seen that in the embodiments of FIGS. 16 and 19 variation in transmission density is caused to take place with half the angular movement of prior art variable density polarizing devices. By choosing relatively larger displacements between the transmission axes of adjacent circle portions variations in light transmission density may be provided with an even smaller amount of rotation of a first layer relative to a second layer.

Figure 17:
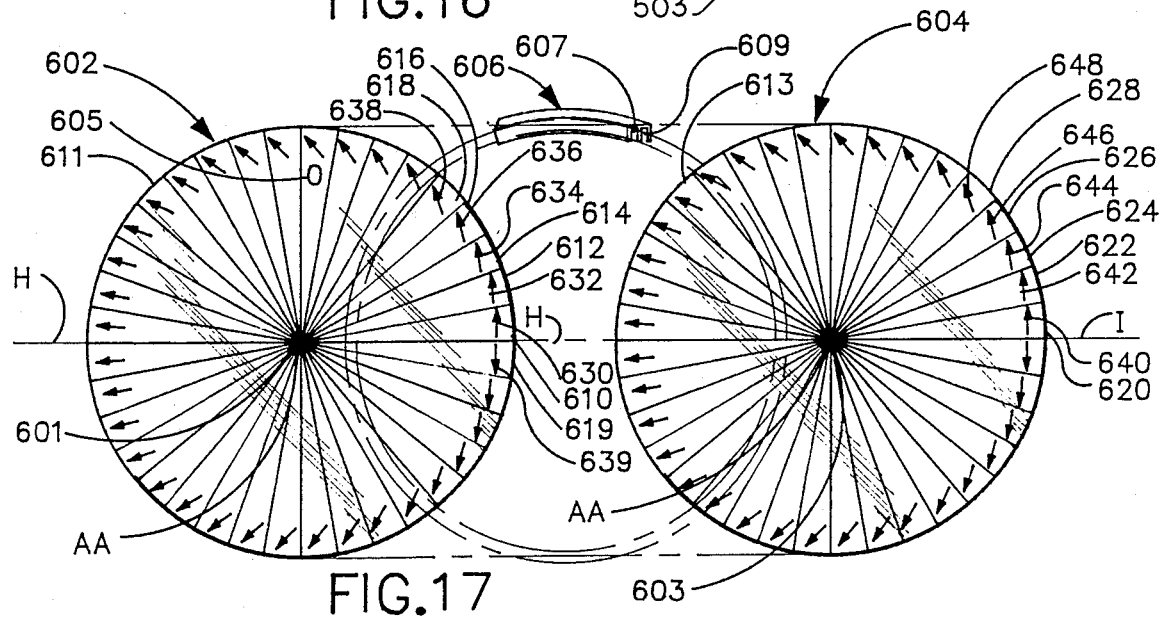
Figure 18:
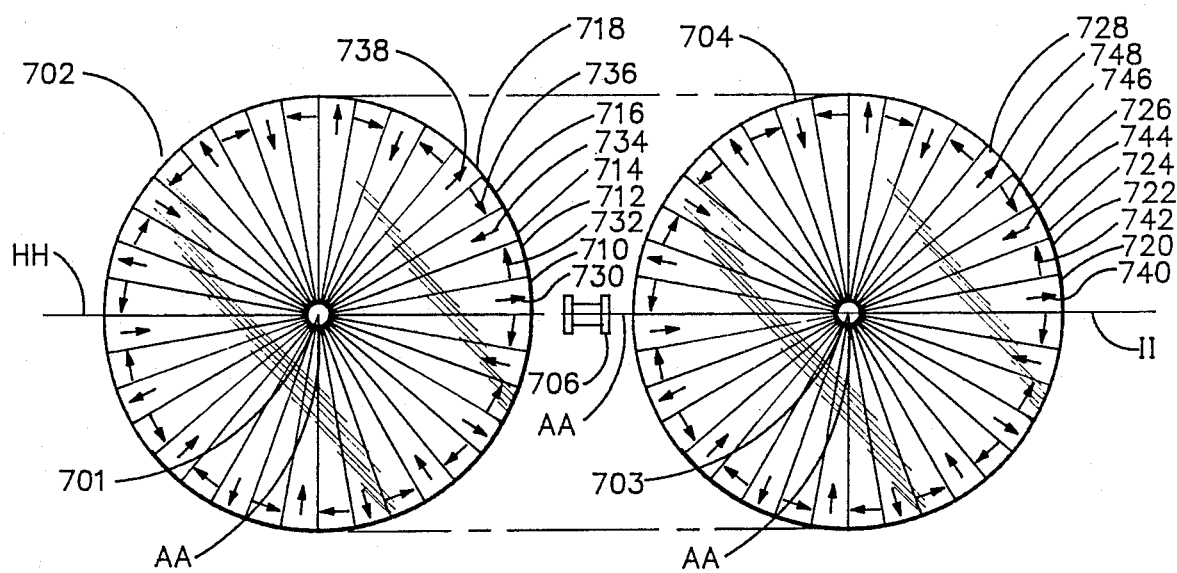

An embodiment in which the angular relationship between adjacent circle portions is increased to achieve such rapid light transmission variance is illustrated in FIG. 18. In this embodiment, a first layer 702 and a second layer 704 having center portions 701, 703, respectively, are connected by a coupling means such as a rivet 706 passing through the centers 701, 703 of each layer enabling relative rotation about central axis AA. In this embodiment the layers comprise equilateral thirty-six sided polygons divided into 10° pie-shaped portions rather than the circular shapes illustrated in FIGS. 16 and 17. The flat sided peripheries of the two polygons may be used to facilitate alignment of the various pie-shaped portions 710, 712, 714, 716, 718, etc., 720, 722, 724, 726, 728, etc. Each of the layers 702, 704 are identical and have axes of transmission 730, 732, 734, 736, 738, etc., 740, 742, 744, 746, 748, etc. in which the angular relationship between adjacent pie-shaped portions on a layer, proceeding in a counterclockwise direction, is increased by 100° over the previous pie-shaped portion. Thus transmission axes 730 and 740 are oriented at 0° relative their respective reference axes HH, II (which are oriented as described above in FIG. 16); transmission axes 732 and 742 are oriented at 100°, 734 and 744 at 200°; 736 and 746 at 300°; 738 and 748 at 400°; etc. It may be seen that in this relationship any alignment position of opposite pie-shaped portions on the two layers will yield one of two possible angular relationships between the transmission axes of opposite portions. In one alignment position such as when pie-shaped portion 710 is positioned opposite pie-shaped portion 720, the transmission axes are parallel for maximum light transmission. In a second alignment position such as when pie-shaped portion 710 is positioned opposite pie-shaped portion 722, transmission axes 730 which in its original position was oriented at 0° relative fixed reference axis II is now positioned at a 10° counterclockwise rotation with respect to transmission axis II. Since transmission axis 742 is positioned at 100° counterclockwise rotation with respect to axis II the transmission axes 730 and 742 are positioned at a 90° angular relationship which provides complete annihilation of light passing through the two layers. It will be seen that a further 10° rotation of layer 702 will again bring the axes of aligned portions of the two layers 702, 704 into parallel relationship. Thus a light density variation from maximum transmission to total annihilation is provided by a relatively small angular displacement of 10° in the embodiment illustrated in FIG. 18.

FIG. 17 illustrates an embodiment of the invention in which the amount of variation in light density which is achieved through rotation of one layer 602 with respect to another layer 604 is designed to take place over a relatively large rotational displacement between the layers. Whereas adjustment from maximum light transmission to total annihilation occurs over 90° rotation between layers in prior art devices, in the specific embodiment described in FIG. 17 the variation from maximum transmission to total annihilation is designed to occur over 180°. In this embodiment a first layer 602 and a second layer 604 are each divided into thirty-six equal circle portions and connected by a coupling ring 606 identical to the construction described above with respect to FIG. 16 except for the orientation of the transmission axes 630, 632, 634, 636, 638, etc.; 640, 642, 644, 646, 648, etc. in the various circle portions 610, 612, 614, 616, 618, etc., 620, 622, 624, 626, 628, etc. In this embodiment transmission axes 630 of circle portion 610 and transmission axes 640 of circle portion 620 are oriented at 90° with respect to associated reference axes HH and II. The transmission aces 632, 642 in the next counterclockwise succeeding circle portions 612, 622 are positioned at an angle 5° counterclockwise of the transmission axes 630, 640, respectively. This pattern of 5° counterclockwise incremental change in transmission axes orientation for each succeeding counterclockwise positioned circle portion is continued throughout each circular layer 620, 604 thus the angles of orientation of the transmission axes relative their associated reference axes HH or II are as follows: 630, 640 equal 90°; 632, 642 equal 95°; 634, 644 equal 100°; 636, 646 equal 105°; 638, 648 equal 110°, etc.

In operation, as layer 602 is rotated 10° from the initial alignment position shown in FIG. 17 transmission axes 630 are repositioned at an angle of 100° with respect to reference axis II. Since transmission axes 642 are positioned at 95° relative line II the angular difference between the two transmission axes 630, 642 is 5°. Thus it will be seen that a 10° rotation of layer 602 with respect to layer 604 produce a 5° incremental change between the transmission axes in each of the aligned pie-shaped portions. It will also be apparent that the angular difference between all circular portions in this first 10° rotated position is equal to 5°. It will thus be seen that a rotation of layer 602 with respect to layer 604 of 180° is required to produce a 90° angular displacement between the transmission axes of the aligned circular portions on the different layers to produce total annihilation of light transmission. Again, as explained above with reference to FIG. 16, in constructing the layers 602, 604 it is necessary to choose a proper number of circular divisions and an appropriate incremental change in the transmission axes orientation between adjacent pairs of circle portions to provide a proper periodic series on incremental change in the transmission axes of each layer such that no discontinuities occur.

The various polarizing layers described in the application may be formed by cutting longitudinal strips or squares or pie-shaped circle portion arranged at different angles from a polarized sheet having a single transmission axes orientation and thereafter suitably adhering the strips in a selected relationship on a single continuous sheet of transparent material. For example, to form a polarized band having transmission axes oriented at 45° with respect to the direction of extension of the band from a sheet of polarizing material having a single transmission axes orientation, the strip would be cut at an angle of 45° with respect to the transmission axes of the sheet. Suitable adhesives for attaching strips of polarized material to a transparent medium are well known in the art and are described in detail in the aforementioned patents incorporated by reference herein.

It is contemplated that the inventive concepts herein described may be variously otherwise embodied and it is intended that the appended claims be construed to include alternative embodiments of the invention except insofar as limited by the prior art.

What is claimed is:

1. A variable density light transmitting device comprising:
   a first light transmitting layer having a plurality of light polarizing areas with differently oriented transmission axes;
   a second light transmitting layer overlying said first light transmitting layer and linearly movable relative said first layer in a direction generally parallel to said first layer, said second light transmitting layer having a plurality of light polarizing areas of differently oriented transmission axes of corresponding size and arrangement to said light polarizing areas on said first light transmitting layer;
   said light polarizing areas on said first layer being selectively positionable opposite different ones of said light polarizing areas of said second layer by relative linear movement of said first layer with respect to said second layer;
   whereby variable density light transmission is provided through said first and second layers by said relative linear movement;
   opthalmic mounting means adapted to be positioned on the head of a user for receiving said first light transmitting layer and said second light transmitting layer therein at a position whereat light coming to one eye of a user traverse both of said layers;
   a third and fourth layer substantially identical in construction and arrangement to said first and second layer, said third and fourth layer being received in said opthalmic mounting means at a position whereat light coming to a second eye of said user traverses both said third and fourth layers;
   linear movement coordination means operatively associated with said light transmitting layers for linearly moving said first and third layers simultaneously and equally; and
   wherein said light polarizing areas comprise bands extending in a generally vertical direction when said opthalmic mounting means are positioned on a user in an upright orientation and wherein said linear movement coordination means comprises:
   cross member means for fixedly connecting a portion of said first layer with a portion of said third layer whereby lateral movement of said first layer produces corresponding lateral movement in said third layer;
   and further comprising lateral shifting means for shifting said first layer laterally relative said second layer.

2. A variable density light transmitting device comprising:
   a first light transmitting layer having a plurality of light polarizing areas with differently oriented transmission axes;
   a second light transmitting layer overlying said first light transmitting layer and linearly movable relative said first layer in a direction generally parallel to said first layer, said second light transmitting layer having a plurality of light polarizing areas of differently oriented transmission axes of corresponding size and arrangement to said light polarizing areas on said first light transmitting layer;
   said light polarizing areas on said first layer being selectively positionable opposite different ones of said light polarizing areas of said second layer by relative linear movement of said first layer with respect to said second layer;
   whereby variable density light transmission is provided through said first and second layers by said relative linear movement;
   opthalmic mounting means adapted to be positioned on the head of a user for receiving said first light transmitting layer and said second light transmitting layer therein at a position whereat light coming to one eye of a user traverses both of said layers;
   a third and fourth layer substantially identical in construction and arrangement to said first and second layer, said third and fourth layer being received in said opthalmic mounting means at a position whereat light coming to a second eye of said user traverses both said third and fourth layers;
   linear movement coordination means operatively associated with said light transmitting layers for linearly moving said first and third layers simultaneously and equally; and
   wherein said light polarizing areas comprise bands extending in a generally horizontal direction when said opthalmic mounting means are positioned on a user in an upright orientation and wherein said linear movement coordination means comprises:
   cross member means for fixedly connecting a portion of said first layer with a portion of said third layer whereby vertical movement of said first layer produces corresponding vertical movement in said third layer;

and further comprising vertical shifting means for shifting said first layer vertically relative said second layer.

3. A variable density light transmitting device comprising:
- a first light polarizing layer having at least three adjacently positioned, equal width light polarizing bands; each band having parallel linear light transmission axes throughout the band; the angle of orientation of the linear transmission axes in each band with respect to the linear transmission axes of an adjacent band being such that each succeeding band has a transmission axis angle of orientation a constant incremental amount smaller than that of the immediately succeeding band;
- a second light polarizing layer substantially identical to said first light polarizing layer;
- mounting means for holding said first layer in selectively movable generally parallel relationship with said second layer;
- whereby said first and second light polarizing layers comprise at least a first, second, and third layer alignment positions provided by relatively shifting said layers one band width between said first and second alignment position and one band width between said second and third alignment positions in which a different density light transmission through overlying portions of said two layers is provided in each said alignment position and in which the angular relationship between linear transmission axes of oppositely positioned bands on said two layers is a constant value throughout all overlying portions of the two sheets, whereby the degree of transmission of unpolarized light throughout said overlying portions of said two layers is a constant value for any of said at least three alignment positions.

4. The invention of claim 3 wherein each polarizing band width is sufficiently small and wherein the difference between the linear transmission axes angles of orientation of adjacent polarizing bands are sufficiently close in value so as to make the difference in the amount of light transmitted by the device in said first alignment position of said layers and the amount of light transmitted in said second alignment position of said layers, substantially indistinguishable to the unaided human eye, whereby shifting of said first layer relative said second layer produces the appearance of a continuous change in light transmission density to the unaided human eye.

5. A variable density light transmitting device comprising:
- a first light transmitting layer having a plurality of identically polygonally-shaped, continuously connected, polarizing areas, transmission axes within any polarizing area being linear and parallel throughout said area; the orientation of the linear light transmission axes in each polarizing area being one of at least three different orientation; the number of polarizing areas having linear transmission axes oriented in any one of said at least three different orientations being approximately equal to the number of polarizing areas having linear transmission axes oriented in any other one of said at least three different orientations; said polarizing areas having different linear transmission axes orientations being arranged in a predetermined repeating array;
- a second light transmitting layer having a plurality of polarizing areas substantially identical in construction and arrangement to said polarizing areas of said first light transmitting layer;
- positioning means for holding said first layer in parallel relationship with said second layer and for enabling parallel shifting movement between said layers, whereby said light polarizing areas on said first layer are selectively positionable opposite different areas of said light polarizing areas of said second layer by relative linear movement of said first layer with respect to said second layer;
- said first and second layers comprising at least three layer alignment positions in which a different density light transmission throughout overlying portions of said two sheets is provided in each alignment position and in which the angular relationship between linear transmission axes of oppositely positioned polarizing areas on said two layers is a constant value throughout all overlying portions on said two layers whereby the degree of transmission of unpolarized light through all overlying portions of the two layers is a constant value for any of said at least three alignment positions.

6. The invention of claim 5:
- wherein said first light transmitting layer comprises a first polarizing zone having a gridwork of adjacent polarizing rectangles, said rectangles in said gridwork being arranged in longitudinally extending columns and laterally extending rows;
- wherein alternating columns and alternating rows of polarizing rectangles have identical configurations and wherein adjacent columns and adjacent rows of polarizing rectangles have different configurations.

7. The invention of claim 6 wherein one column comprises a plurality of alternating polarizing squares having linear transmission axes angles of orientation of 45° and 90° with respect to a fixed reference axis and wherein and adjacent column comprises a plurality of alternating polarizing squares having linear transmission axes angles of orientation of 0° and 135° with respect to said fixed reference axis.

8. A variable density light transmitting device comprising:
- a first light transmitting layer:
- a second light transmitting layer;
- said first light transmitting layer comprising a first polarizing zone having at least three adjacent, substantially identical size pie-shaped, light polarizing portions arranged about a common center point and having at least three different linear transmission axes orientations with respect to a reference axis in a fixed location in each pie-shaped portion; each pie-shaped portion having parallel linear light transmission axes therewithin; the angle of orientation of said linear transmission axes of each pie-shaped portion being such that the difference between said angles of orientation of the linear transmission axes of any two adjacent pie-shaped portions is substantially a constant value throughout said first polarizing zone;
- said second light transmitting layer comprising a second polarizing zone substantially identical to said first polarizing zone and positionable opposite thereto;
- said first light transmitting layer being relatively rotatably movable with respect to said second light transmitting layer about an axis substantially perpendicular to said layers and passing through said common center point of said pie-shaped portions on each layer;

said light transmitting layers having a first rotated position wherein said light polarizing pie-shaped portions in said first polarizing zone are positioned opposite light polarizing pie-shaped portions in said second light polarizing zone, wherein the difference between the angles of orientation of the linear transmission axes for each of said oppositely positioned pairs of pie-shaped portions is equal to a constant first value;

said light transmitting layers having a second rotated position wherein said light polarizing pie-shaped portions in said first polarizing zone are positioned opposite light polarizing pie-shaped portions in said second zone, wherein the difference between the angles of orientation of the linear transmission axes for each of said oppositely positioned pairs of pie-shaped portions is equal to a constant second value;

said light transmitting layers having a third rotated position wherein said light polarizing pie-shaped portions in said first polarizing zone are positioned opposite light polarizing pie-shaped portions in said second zone, wherein the difference between the angles of orientation of the linear transmission axes for each of said oppositely positioned pairs of pie-shaped portions is equal to a constant third value different from said first value and said second value and wherein the difference between said first value and second value is equal to the difference between said second value and said third value.

9. The invention of claim 8 wherein each polarizing zone comprises a series of adjacent polarizing pie-shaped portions wherein each angularly succeeding pie-shaped portion in the series has a transmission axis angle of orientation a constant incremental amount different than the transmission axis angle of orientation of the preceding adjacent pie-shaped portion.

10. The invention of claim 9 wherein each pie-shaped portion has a central angle defined by two radially extending borders said central angle of each pie-shaped portion being sufficiently small and the difference between the linear transmission axes angles of orientation of adjacent pie-shaped portions being sufficiently close in value to said central angles so as to make the difference in the amount of light transmitted by the device in one position of said first layer and the amount of light transmitted in a second position of said first layer rotated one pie-shaped portion from said first position, substantially indistinguishable to the unaided human eye, whereby shifting of said first layer relative said second layer produces the appearance of a continuous change in light transmission density to the unaided human eye.

11. A variable density light transmitting device comprising a first light transmitting layer having a plurality of light polarizing areas with at least three differently oriented linear transmission axes; a second light transmitting layer overlying said first light transmitting layer and movable relative said first layer while remaining generally parallel to said first layer, said second light transmitting layer having a plurality of light polarizing areas with at least three differently oriented linear transmission axes and of corresponding size and arrangement to said light polarizing areas on said first transmitting layer; said light polarizing areas on said first layer being selectively positionable opposite different ones of said light polarizing areas of said second layer by relative movement of said first layer with respect to said second layer; whereby variable density light transmission is provided through said first and second layers by said relative movement; said first and second layers having at least three alignment positions comprising a first alignment position wherein the angular relationship between the linear transmission axes in oppositely positioned portions of said first and second layers is a first constant value in a first alignment position, a second constant value in a second alignment position and a third constant value in a third alignment position; said first, second, and third values being different; the difference between said first and second value being equal to the difference between said second and third value; whereby three different degrees of light transmission through said two layers are provided by said three alignment positions and whereby the degree of light transmission provided through overlying portions of said two layers is uniform in each said three alignment positions.

* * * * *